Feb. 17, 1953 C. B. DALE 2,628,845

PHONOGRAPH

Original Filed Dec. 15, 1949

4 Sheets-Sheet 1

INVENTOR.
Colin B. Dale
BY
Denning & Denning
Attys.

Feb. 17, 1953 C. B. DALE 2,628,845

PHONOGRAPH

Original Filed Dec. 15, 1949 4 Sheets-Sheet 2

INVENTOR.
Colin B. Dale

BY Banning & Banning
Attys.

Feb. 17, 1953 C. B. DALE 2,628,845

PHONOGRAPH

Original Filed Dec. 15, 1949 4 Sheets-Sheet 3

INVENTOR.
Colin B. Dale
BY
Banning & Banning
Attys.

INVENTOR.
Colin B. Dale
BY
Dunning & Dunning
Attys.

Patented Feb. 17, 1953 2,628,845

UNITED STATES PATENT OFFICE 2,628,845

PHONOGRAPH

Colin B. Dale, Oak Park, Ill., assignor to Webster-Chicago Corporation, Chicago, Ill., a corporation of Illinois Original application December 15, 1949, Serial No. 133,168. Divided and this application January 13, 1950, Serial No. 138,474

2 Claims. (Cl. 274—15)

The main objects of this invention are to provide an improved construction and arrangement of the several parts of and operating mechanisms for a phonograph; to provide for the tone arm of the phonograph an improved form and mounting of a counterweight which is rendered automatically effective, when the tone arm is in playing position, to assure as light a bearing as possible of the needle on the record, but which is rendered automatically ineffective to counterbalance the weight of the tone arm when it is being retracted to starting position; to provide an improved form and operation of mechanism for automatically returning the tone arm to starting position and resetting it, and simultaneously effecting the actuation of the record-release means to permit successive playing of a plurality of records; and to provide an improved form of record-changing phonograph in which the various parts of each mechanism are so combined, and the several mechanisms are so coordinated, as to make it very economical to manufacture, simple and positive in control and operation, and highly efficient in tone reproduction.

Figures 6, 7, 8:
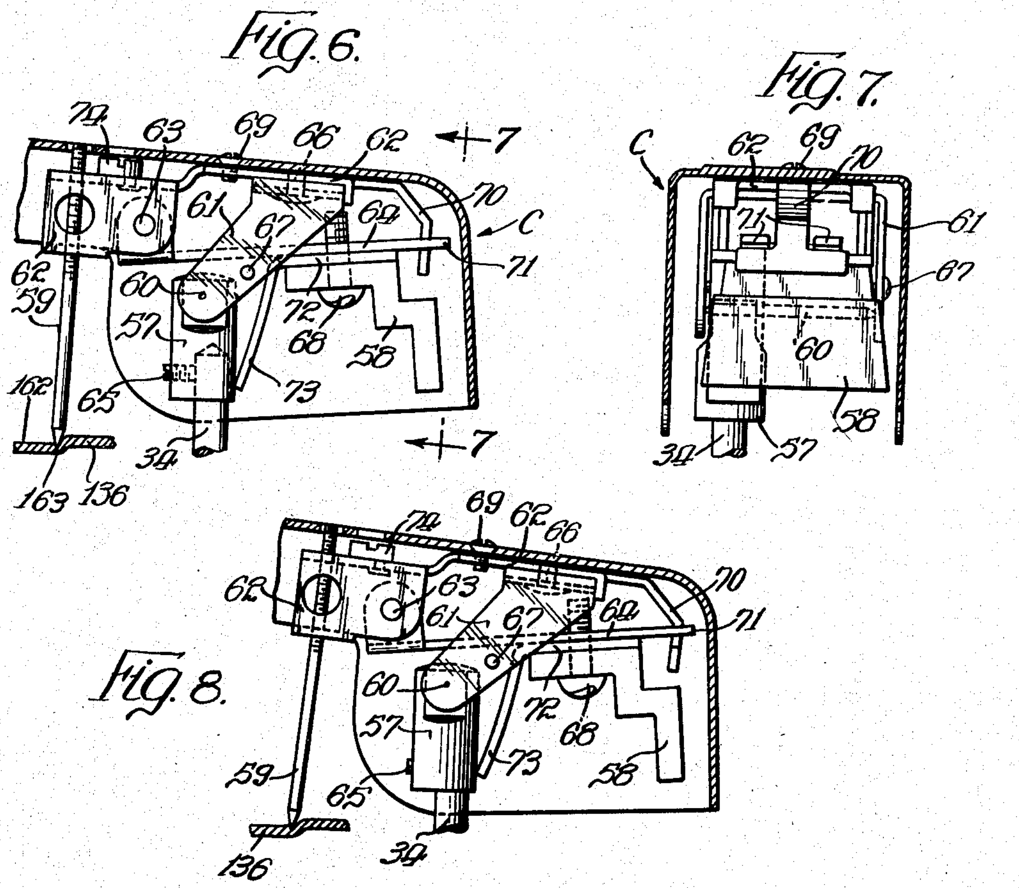
Fig. 6 is an enlarged, cross-sectional view of the rear end of the tone arm showing the relative positions of the counterweight and the related parts at the instant the counterweight becomes effective or ineffective in counterbalancing the weight of the tone arm.
Fig. 7 is a transverse, sectional detail, taken on line 7—7 of Fig. 6.

Fig. 8 which is a view similar to Fig. 6 shows the relative positions of the counterweight and the related parts when the outer end of the tone arm has been elevated and the counterweight has become ineffective as a counterbalance to the tone arm.

A phonograph embodying this invention comprises a support A mounting a motor-driven record-supporting turntable B, a reciprocating tone-reproducing arm C, and a record support and release means D wherewith is associated a speed-changing and switch-actuating mechanism E, a tone arm retracting and record-release actuating mechanism F, and a manually operable record-release actuating means G which also serves as a starting means for the phonograph.

*Support for the operating mechanism*

The support A comprises a base 31 in the form of a plate upon which is arranged all of the mechanism for the present phonograph, including a platform 32, a record spindle 33, a tone arm post 34, and a motor 35.

The base 31 herein shown as rectangular is provided with reinforcing flanges 36 along its lateral edges, and with certain struck-out lugs, fingers, shoulders, and certain openings, as will be noted hereinafter in the descriptions of the several mechanisms. At one corner the base 31 suspends a plate 37 whereto is attached the motor 35. This suspension involves the use of rubber cushions 38 (see Fig. 5) in order to reduce to a minimum the transmission of motor vibrations to the record-supporting turntable B. Adjacent this suspension of the motor plate 37, the base plate is depressed, as shown at 39, and recessed in order to better provide for mounting of the turntable drive pulley 40 which forms a part of the speed-change and switch-control mechanism E.

Figure 3:
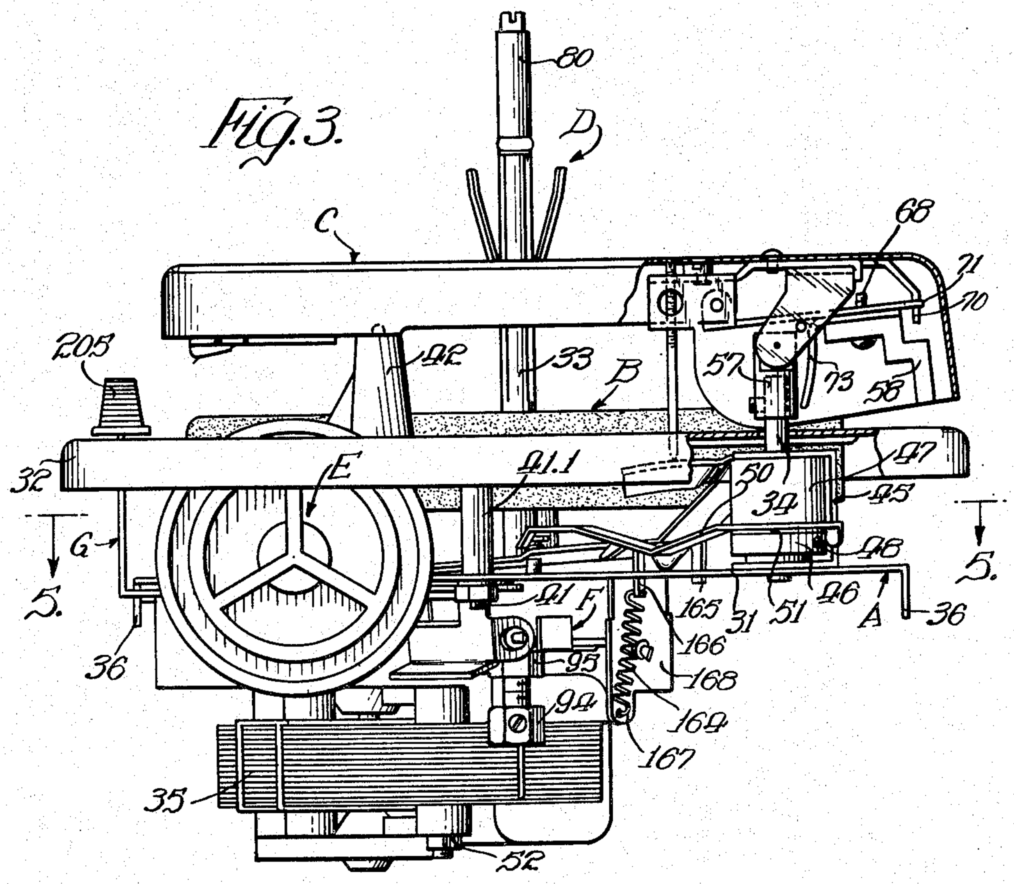
Fig. 3 is an elevational view thereof, a part of the tone arm being broken away so as to more clearly illustrate the arrangement of the counterbalancing weight therefor.
Figure 5:
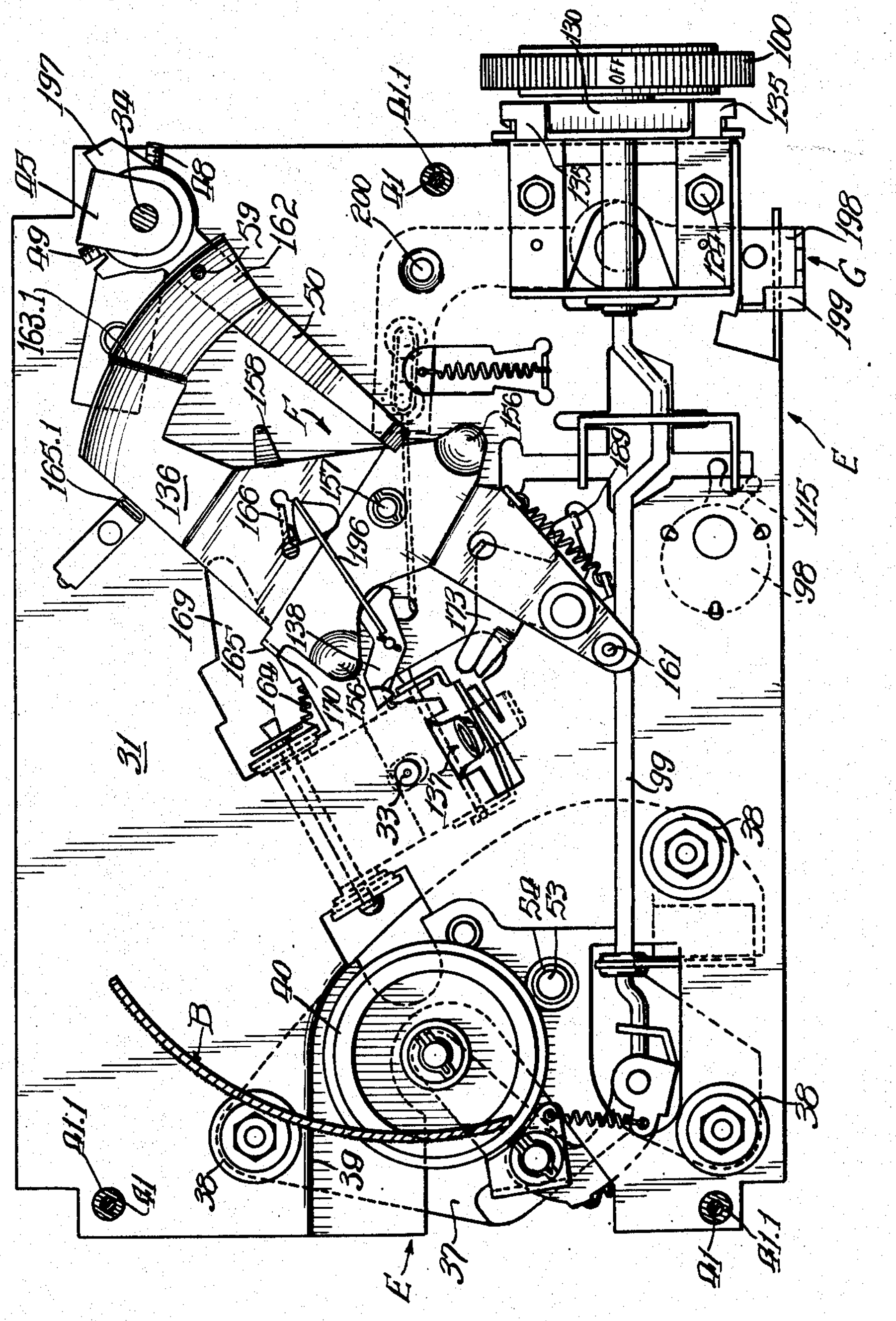
Fig. 5 is an enlarged plan view of the several operating mechanisms in their normally inoperative positions, as viewed from the plane of line 5—5 of Fig. 3, immediately prior to the placing of the tone arm in position for reproducing a record.

The platform 32 is in the form of a plate supported in spaced relationship to the base 31 by bolts and nuts 41 and bushings 41.1 (see Figs. 3, 5 and 6). The platform 32 mounts a tone arm rest 42.

The post 34 which mounts the tone arm C is rotatably mounted on a U-shaped bracket 45 secured adjacent one corner of the base 31, and has associated therewith a collar 46 and a bushing 47. The collar 46 is keyed to the post 34 and has headless screws 48 and 49 (see Fig. 5) which abut the opposite edges of the vertical part of the bracket 45 to limit swinging movement of the tone arm C.

The bushing 47 holds a feeler arm 50 (forming a part of the tone arm return and record-release actuating mechanism F which is to be described more fully hereinafter) in contact with a friction pad 51 resting on the collar 46, the purpose of which will be explained at a later point.

Figure 2:
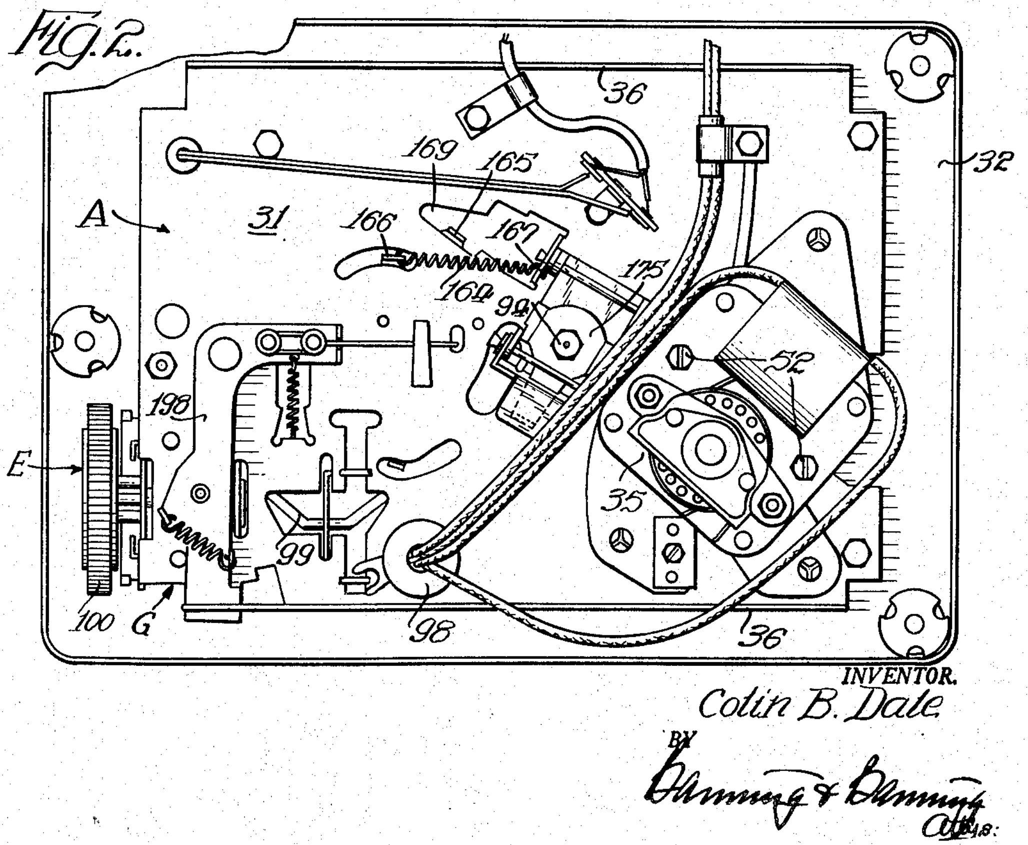
Fig. 2 is a bottom or under side view of the same, the view being reversed 180 degrees from that of Fig. 1.

The motor 35 may be of any type suitable for this purpose. As herein shown, it is attached to the under side of the plate 37 by suitable bolts and nuts 52 (see Figs. 2 and 3) so as to locate the drive shaft 53 of the motor 35 in position for contact by the turntable drive pulley 40 (see Fig. 5). The drive shaft 53 is formed with an enlargement 54 at its upper end, preferably by pressing thereon a short section of a wire spring of suitable diameter and gauge wire. This enlargement and the shaft directly below provide hubs of slightly differing diameters wherewith the turntable drive pulley 40 coacts to operate the turntable B at two different speeds.

*The turntable*

Figure 4:
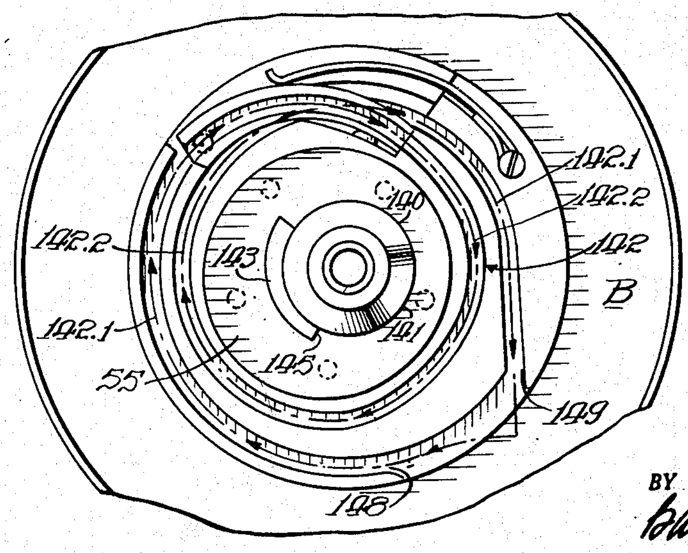
Fig. 4 is an enlarged under side view of the turntable, showing the three tracks of the cam for the tone arm retracting and record-release actuating mechanism, and by arrows diagramming the path of the cam track follower which effects a lifting of the tone arm and its return to, and resetting at, starting position.

The turntable B is in the form of a flanged casting mounting on its under side a cam disc 55 (see Fig. 4). The cam forms a part of the tone arm retracting and record-release actuating mechanism F. In the hub of the disc is fixed a bushing 56 whereby the turntable is journaled on the spindle 33. A suitable covering of friction material, such as flock, is spread over the top and flange of the turntable B so as to ensure the holding of a record in rotative contact therewith.

*The tone arm*

Figure 1:
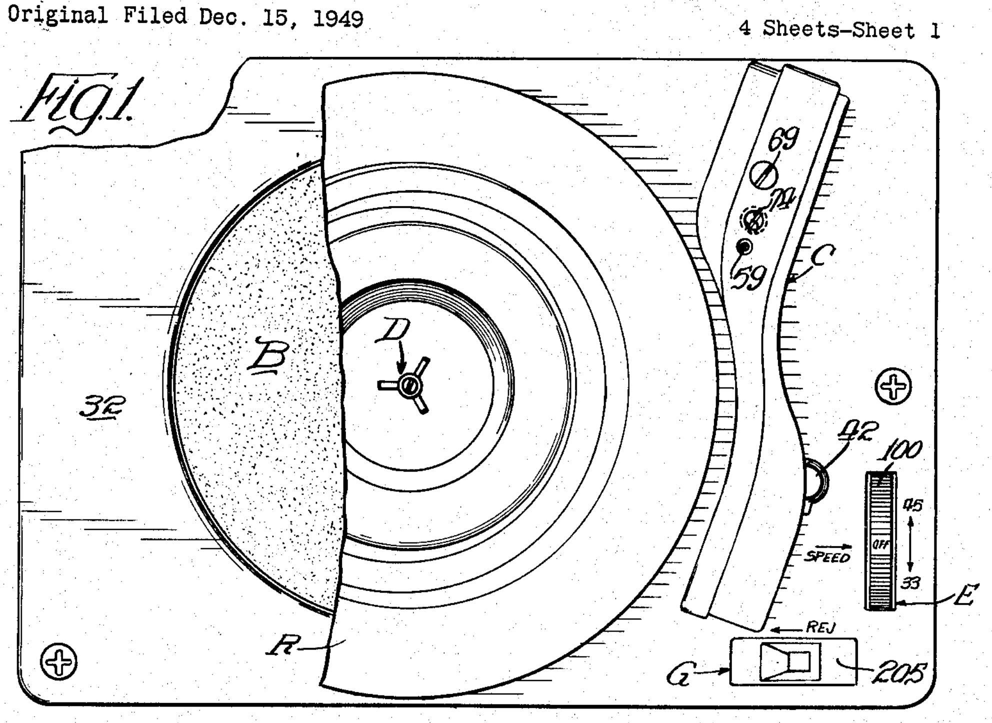
Figure 1 is a plan view of an improved speed-altering, record-changing phonograph embodying this invention, the tone-reproducing arm being in the rest position, and a part of the record being broken away so as to show the record-supporting turntable.

The tone arm C is in the form of a light metal casting somewhat S-shaped (see Fig. 1) at the forward end of which is mounted a suitable recording stylus (see Fig. 3). At its rear end is hinged a mounting hub 57 and a counterweight 58. A pin 59 attached to the tone arm C forwardly of the hub 57 coacts with the tone arm return and record-release mechanism F to secure a return to starting position and also a reset of the tone arm C, as will be subsequently explained.

The mounting hub 57 is keyed to a pin 60 which is journaled on a fork 61 attached to a bracket 62 secured to the inner rear end of the tone arm C. To the bracket 62 is hinged at 63 an arm 64 on the outer end of which is secured the counterweight 58. A set screw 65 on the hub 57 permits it to be removably keyed to the post 34 so as to turn therewith.

The counterweight 58 is preferably formed of a heavy metal such as lead. It is secured to the outer end of the arm 64 by a screw 68. The purpose of this counterweight is to counterbalance the weight of the tone arm C, forwardly of the pivot pin 64, and so lessen the pressure of the recording stylus on the record.

The pin 59 is threaded onto the bracket 62 forwardly of the pivot 63 of the arm 64. It is adapted to be engaged by the tone arm retracting and record-release mechanism F, as will be indicated presently. The pin 60 is preferably supported on the fork 61 by cone bearings, as most clearly shown in Fig. 8. The fork 61 is attached to the bracket 62, preferably by a rivet 66, and adjacent the pin 60 the fork 61 is spanned by a screw 67 which serves to adjust the spacing of the arms of the fork so as to secure the desired tension on the cone bearings of the pin 60.

The bracket 62 is rigidly secured to the tone arm C by a set screw 69 so that the bracket and tone arm are a unit. At its rear end the bracket 62 has a T-shaped extension 70 the stem part of which extends through and locates the transverse part under the legs 71 of the U-shaped terminus of the arm 64 (see Figs. 6, 7, and 8). Thus, for all times when the pin 59 is not contacted by the tone arm retracting and record-release actuating mechanism F, the forward end of the tone arm C, as it swings down toward the record, elevates the transverse part of the T-extension 70 and brings it into contact with the legs 71 of the U-shaped extension of the arm 64 and thereby makes the counterweight 58 an effective counterbalance to the weight of the tone arm C forwardly of the pivotal pin 60.

Between the arm 64 and the counterweight 58 is inserted a plate 72 which has a finger or detent 73 positioned to engage the hub 57 (see Figs. 6 and 8) when the pin 59 is contacted by the tone arm retracting and record-release actuating mechanism F, thereby to render the counterweight 58 inactive. This permits the full weight of the tone arm C forwardly of the pivot pin 60 to be effective to hold the pin 59 in operative relationship with the tone arm retracting and record-release actuating mechanism F. When the tone arm C is in reproducing position and consequently out of contact with the tone arm retracting and record-release actuating mechanism F the finger 73 is retracted from contact with the hub 57 (see Fig. 3). An eccentric screw 74 permits an adjustment of the tone arm to insure the stylus setting down in the pick-up groove at the outer edge of the record.

*The record support and release means*

The record support and release means D which is fully disclosed in my Patent No. 2,579,175, dated December 18, 1951, comprises the spindle 33 mounting a shifting control rod 81 connected to the tone arm return and record-release actuating mechanism F.

*The speed-changing and switch-actuating mechanism*

The speed-changing and switch-actuating mechanism E whose details are disclosed in my Patent No. 2,579,175 of December 18, 1951, comprises the turntable drive pulley 40, a current switch 98, and a crank-shaft 99 mounting a dial 100, whereby the energizing or de-energizing of the motor 35 is synchronized with the shifting of the pulley 40 into and out of engagement with the motor drive shaft 53 or its hub enlargement 54.

*The tone arm return and record-release actuating mechanism*

The tone arm return and record-release actuating mechanism F is disclosed fully in my Patent No. 2,579,175, dated December 18, 1951. As herein shown, it comprises the cam disc 55 on the underside of the turntable B, a tone arm retracting plate 136, and a record-release shifting means 137. These are respectively actuated by two of the cam tracks formed in the cam disc 55, as will be presently explained, and wherewith they are brought into engagement by the coaction of a tripper 138 under the influence of the feeler 50 controlled by swinging movement of the tone arm C.

The cam disc 55, in this particular embodiment, is formed with the hub cam tracks 140 and 141 and a ring cam track 142, respectively (see Fig. 4, constructed to effect (a) a horizontal movement, (b) a vertical movement, and (c) a combination vertical and horizontal movement. The coaction of these parts with the tripper 138, the record-release shifting means 137, and the plate 136, accomplish two co-ordinated results: namely, the return of the tone arm C to starting position, after it has completed the reproducing of a record, and the release of a record for subsequent reproduction.

The tone arm actuating plate 136 is substantially a bell crank lever, somewhat broadened at its middle part 155. At the opposite sides of this broadened part are formed embossments 156 which coact with a pivot pin 157 to so support the plate 136 as to permit its swinging in a horizontal plane about the vertical axis of the pivot pin 157, and its tilting in a vertical plane about a shifting horizontal axis which extends through the points of contact of the embossments 156 on the base 31 and a contiguous groove 163.1 disposed radially of the plate pivot. A lub 158 on the arm 136 also contacts the base 31 and coacts with the embossments 156 to provide for this combination shifting and tilting movement of the plate 136 on the base 31.

The pin 157 extends through an aperture in the plate 136 slightly larger than the diameter of the pin 157 so as to permit the tilting action and the swinging movement just described. A spring 159 interposed between the plate 136 and a washer 160 on the pin 157 normally holds the plate 136 with the embossments 156 and the lug 158 in contact with the base 31, and yieldingly resists the vertical tilting of the plate 136.

Secured at one end of the plate 136 is a cam track follower pin 161 and at the opposite end of this plate is formed an integral arcuate shaped extending arm 162 formed intermediately of its ends with a traverse ledge 163. This arcuate arm 162 is adapted to engage the pin 59 to elevate the tone arm C and return it to its starting position, as a result of the cam follower pin 161 being brought into engagement with the cam track 142, as will be explained more fully hereinafter.

A spring 164 (see Figs. 3 and 5) urges the plate 136 toward its normal or retracted position (see Fig. 5), as limited by stops 165 and 165.1. The spring 164 has one end attached to a lug 166 struck out from the plate 136 and extending down through a slot in the base 31. The other end of the spring 164 is connected to an ear 167 on the end of one of a pair of lugs 168 struck out from the base 31, forming a support for the record-release shifting means 137, presently to be described.

The stop 165 is in the form of a finger struck down from the edge of the plate 136 and extending through an opening 169 (formed by the striking out of the adjacent lug 168 from the base 31) and abuts a shoulder 170 (see Fig. 5) jutting into said opening 169. The stop 165.1 is an angle piece having one leg secured to the base 31 so that its upright leg is contacted by the edge of the plate 136 practically simultaneously with the contact of the finger 165 against the shoulder 170.

*The manually operable record-release actuating means*

The manually operable record-release actuating means G is disclosed fully in my Patent No. 2,579,175, dated December 18, 1951. As herein shown, it comprises a right angle bell crank lever 198 mounting on one of its arms a locking pawl 199 and coacting therewith to permit the tripper 138 to be actuated to effect a release of a record R at any time. If the tripper 138 is not immobilized, the release of a record will be immediate with a shifting of the lever 198. If, however the tripper 138 is immobilized, the bell crank lever 198 will be retained in tripper-actuating position by the pawl 199 until the tripper 138 has been freed, whereupon the lever 198 will be instantly actuated to effect a release of a record.

*Operation*

The operation of this improved phonograph insofar as it relates to the functioning of the tone arm counterweight is as follows:

Let it be assumed that a stack of records R has been placed on the spindle 33. Since none of the mechanisms will operate until the turntable B is rotating, the first step will be to turn the dial 100 from the "off" position to either the "33" or "45" position. This will initiate rotation of the turntable as disclosed in my Patent No. 2,579,175, dated December 18, 1951. Thereupon the plate 136, during its inward and return swinging movement to effect release of a record, will lift the tone arm C from its rest 42 and set it in position for the stylus to engage the pick-up groove on the outer edge of the record. As the tone arm swings into playing position in response to tracking of the stylus on the record, the transverse part of the T-shaped extension 70 of the bracket 62 is moved into contact with the legs 71 of the U-shaped terminus of the arm (see Fig. 3). Thereupon the counterweight 58 becomes effective to counterbalance the weight of the forward end of the tone arm C so as to lighten the pressure of the stylus on the record.

As the tone arm stylus completes its traverse of the recording grooves and follows the rapidly decreasing spiral inwardly of the recording grooves, the feeler 50 which has been swinging concurrently with the tone arm C comes into contact with the finger 196 on the tripper 138. If the cam 193 of the tripper 138 is in contact with the cam quadrant 143, the feeler 50 momentarily will be ineffective to swing the tripper 138 on its pivot. However, by reason of the frictional engagement of the feeler 50 with the tone arm collar 46, the tone arm C will continue its inward swing, thus holding the feeler 50 in contact with the finger 196 until the tripper 138 has been released from the cam quadrant 143. Thereupon the subsequent engagement of the tripper cam 193 by the shoulder 145 will cause the tripper 138 to initiate a swinging of the plate 136 as hereinbefore explained in connection with actuation of the mechanism G. If, on the other hand, the feeler 50 contacts the finger 196 of the tripper 138 when it is not immobilized by the cam quadrant 143, the tripper 138 will be immediately swung on its pivot 192 to bring the cam end 193 into the path of the shoulder 145. Thereupon the tripper 138 will be actuated to initiate a swinging of the plate 136, as explained in my Patent No. 2,579,175 dated December 18, 1951, to enter the cam track follower 161 into the opening 148 to the cam track 142.

As the turntable B continues its rotation, the cam track follower 161 on the plate 136 follows the path indicated by the arrows in Fig. 4 which is an under side view of the turntable cam 55. From this figure it will be noted that the cam track follower 161, after about a half revolution of the turntable B, begins to move spirally inwardly to the inner portion 142.2 of the cam track 142. As the follower 161 completes its inward travel the shoulder 184.1 on the lever 173 contacts the tripper 138 and restores it to its normal position preparatory to its subsequent activation to again initiate a shifting of the plate 136 to engage the follower 161 with the cam track 142. After the cam track follower 161 has completed approximately a full revolution of the turntable cam 55, the follower 161 begins to move spirally outwardly into the outer portion 142.1 of the cam track 142 toward the discharge opening 149.

The depression of the cam track follower 161 by the high point of the cam track 142 causes a rocking of the plate 136 on the embossments 156 and elevates the extension 162 so as to contact the pin 59 of the tone arm C. As a result, the tone arm is tilted to move the stylus out of contact with the record. As the cam track follower 161 moves through the second half of the inner cam track portion 142.2, and approaches the section 151, the plate 136 is swung in a horizontal plane on the pin 157. This results in bringing the ledge 163 on the extension 162 in contact with the pin 59 on the tone arm C. As this extension is moved outwardly, the pin 59 is moved into contact with the ledge 163 and becomes seated in the groove 163.1. As a consequence the tone arm is shifted outwardly toward its starting position, and with the return inward movement of the extension 162 the tone arm is swung into a position for lowering the stylus into contact with the pickup groove in the record when the extension is retracted from its contact with the pin 59. The elevation of the tone arm C, incident to its being returned to starting position, swings the rear end of the tone arm downwardly and brings the finger 73 into contact with the hub 57 (see Figs. 6 and 8). The transverse part of the T-shaped extension 70 of the bracket 62 is thereupon freed of contact with the legs 71 of the U-shaped terminus of the arm 64. The weight 58 is consequently rendered inactive as a counterbalance for the tone arm C, with the result that the full weight of the tone arm, forwardly of the hinge pin 66, holds the pin 59 in firm contact with the plate extension 162.

As the cam track follower 161 travels from the inner portion 142.2 of the cam track 142 to the outer portion 142.1, it not only swings the plate 136 to move the tone arm C inwardly toward the record, but by reason of the receding character of the cam track 142 it permits the spring 159 to exert a pressure to restore the plate 136 to its normal position with the lug 158 in contact with the base 31. As the cam track follower 161 approaches the exit opening 149 of the cam track 142, the tone arm C is poised in starting position over the record that has been released for positioning on the turntable as the plate 136 initiated the elevation and retraction of the tone arm C. As the cam track follower 161 is released from the cam disc 55, the spring 159 consummates the restoration of the plate 136 to its normal position and frees the pin 59 from the plate extension 162 so that the tone arm stylus will engage the record. This release of the pin 59 from the plate extension 162 results in a restoration of the contact of the transverse part of the T-extension 70 of the bracket 62 with the legs 71 of the U-shaped terminus of the arm 64. Thereupon the counterweight 58 is effective as a counterbalance to the weight of the tone arm C forwardly of its support on the post 34, with the resultant light contact of the stylus with the record.

The subject matter herein claimed was first disclosed in my application filed December 15, 1949, Serial No. 133,168, of which this case is a division.

I claim:

1. In a phonograph, the combination of a supporting base, a record-supporting turntable journaled for rotation on the base, a motor mounted on the base and connectable to rotate the turntable, a tone arm oscillatingly mounted on the base and supporting a stylus to traverse a record on the turntable, means providing a hinge for the tone arm to permit swinging in a vertical plane into and out of recording contact with a record, a plate mounted intermediately its ends on the base to swing in a horizontal plane on a vertical axis and tilt in a vertical plane on a horizontal axis, a cam member associated with the turntable and having a track adapted to effect horizontal and vertical movement, a cam track follower on one end of the plate adapted to traverse the cam track to effect a tilting and swinging of the plate, means on the other end of the plate adapted to engage the tone arm to elevate the same and carry it to starting position when the plate is tilted and swung as a result of engagement of the follower with the cam track, tripper means actuated by the tone arm as it approaches the limit of its inward movement to shift the plate to initiate engagement of the cam track follower with the cam track whereby the plate is actuated by said cam member to return the tone arm to starting position, a second arm hinged on the tone arm adjacent the hinge, a weight fixed on the second arm rearwardly of the tone arm hinge, coacting shoulders on the second arm and the tone arm adapted to engage each other when the tone arm is released for stylus recording contact with a record on the turntable and thereby counterbalance the weight of the tone arm on the record, and a detent on the second arm adapted to engage the means whereon the tone arm is hinged to render the weight ineffective as a counterbalance when the tone arm is engaged by the plate whereby the full weight of the tone arm forwardly of its hinge operates to hold the tone arm in contact with the plate during the return of the tone arm to starting position.

2. A phonograph tone arm mounting a recording stylus at the outer end, a supporting member whereon the tone arm is hinged adjacent the opposite end thereof for movement in a vertical plane, a second arm hinged to the tone arm forwardly and above the hinge connection of the tone arm to the supporting member, a weight fixed on the second arm rearwardly of the tone arm hinge, a shoulder on the tone arm disposed vertically under and adapted to control the rear end of the second arm to render the weight effective as a counterbalance when the tone arm swings to contact the stylus with the record, and a downwardly-disposed detent on the second arm adapted to contact the tone arm supporting member and render the weight ineffective as a counterbalance when the tone arm is swung above a predetermined angular position to remove the stylus from contact with a record.

COLIN B. DALE.

REFERENCES CITED

The following references are of record in the file of this patent:

UNITED STATES PATENTS

| Number | Name | Date |
|---|---|---|
| 1,764,957 | Jakosky | June 17, 1930 |
| 2,509,811 | Dale | May 30, 1950 |

FOREIGN PATENTS

| Number | Country | Date |
|---|---|---|
| 373,795 | Great Britain | June 8, 1932 |
| 879,598 | France | Feb. 26, 1943 |
| 71,244 | Norway | Nov. 4, 1946 |